(No Model.)
W. KAISER.
BIRD CAGE.
No. 324,704. Patented Aug. 18, 1885.
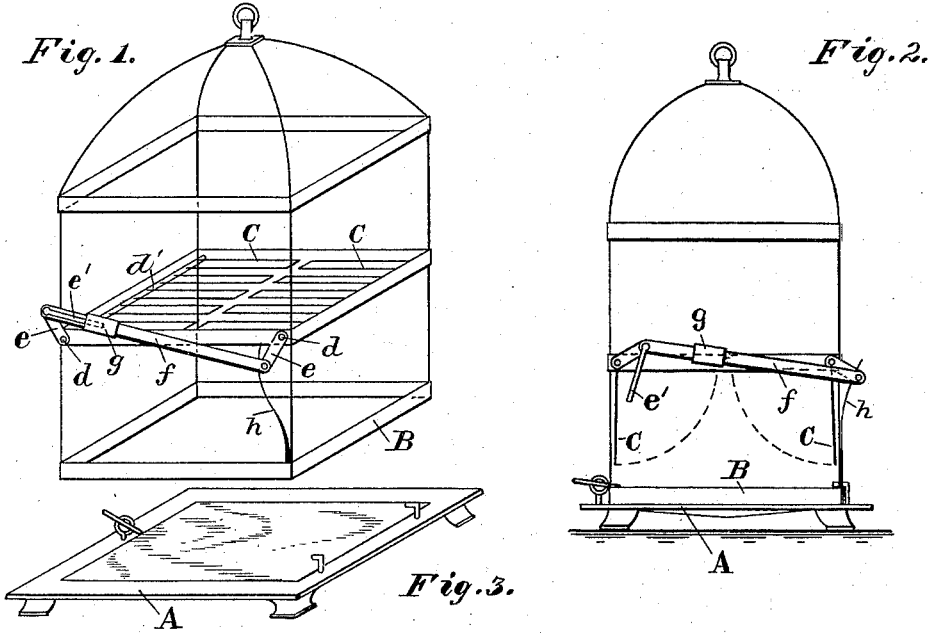
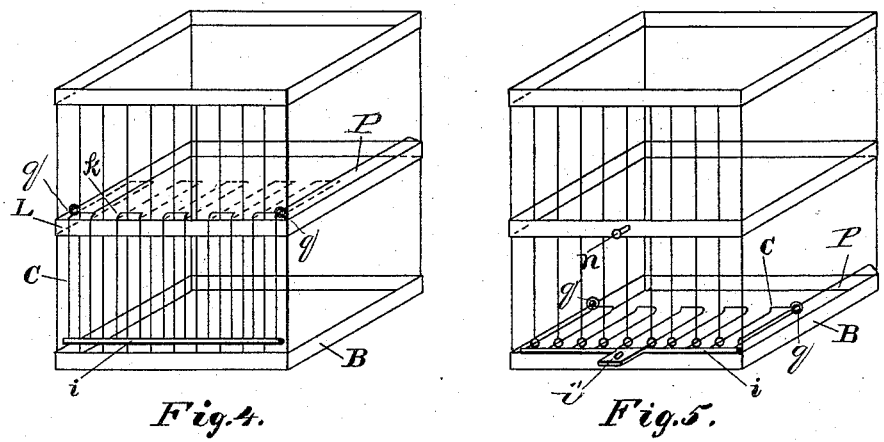
WITNESSES:
A. C. Eader
J. Edward Morris.
INVENTOR:
Wm Kaiser
By Chas B. Mann
Attorney.

UNITED STATES PATENT OFFICE.

WILLIAM KAISER, OF WILKES-BARRÉ, PENNSYLVANIA.

BIRD-CAGE.

SPECIFICATION forming part of Letters Patent No. 324,704, dated August 18, 1885.

Application filed July 25, 1884. (No model.)

*To all whom it may concern:*

Be it known that I, WILLIAM KAISER, a citizen of the United States, residing at Wilkes-Barré, in the county of Luzerne and State of Pennsylvania, have invented certain new and useful Improvements in Bird-Cages, of which the following is a specification.

My invention has for its object to provide a bird cage with a supplemental bottom adapted to assume a vertical position when the ordinary bottom is on, and a horizontal position in place of the ordinary bottom when the latter is removed for cleaning.

In the accompanying drawings, which illustrate the invention, Figure 1 is a perspective view of the skeleton of a bird-cage, showing the ordinary bottom removed and showing the supplemental bottom in a horizontal position. Figure 2 is an elevation of same, showing the ordinary bottom attached and the supplemental bottom in a vertical position. Fig. 3 is a view of the ordinary bottom detached. Figs. 4 and 5 are views illustrative of modifications of the supplemental bottom.

For the purpose of more clearly showing the feature which constitutes this invention, the wires which form the usual walls of the cage are omitted in Figs. 1 and 2.

The letter A designates the ordinary bottom of a bird-cage; B, the lower band of the cage, to which the bottom is detachably connected by the usual hooks or any other suitable means.

In cages as ordinarily constructed the bird is liable to escape when the ordinary bottom is removed to be cleaned. In order to prevent this I provide a device adapted to be brought into position in place of the ordinary bottom when the latter is about to be removed, as hereinafter explained.

The supplemental bottom consists of two wings, C, hinged to the inner sides or walls of the cage, their pivots being designated by *d*. Each wing is shown in Figs. 1 and 2 as attached to a rod, *d'*, whose ends terminate in the said pivots. The two wings are thus adapted to take a vertical position against the walls of the cage, as shown in Fig. 2, and are also adapted, as shown in Fig. 1, to take a horizontal position which enables them to serve as a supplemental bottom. The wires which compose the wings or supplemental bottom are spaced apart the same as the wires of the cage-walls, (not shown,) so that when the wings have vertical position they do not add any obstruction to the view of the bird.

For convenience of moving the supplemental bottom and holding the two wings which compose it in either position, a lever, *e*, is attached to one of the pivots *d* of each wing, and these levers are connected by a bar or wire, *f*, as shown. One of the levers *e* has at its end an extension, *e'*. A sleeve, *g*, is on the bar *f* and is adapted to slide loosely thereon. When the wings are turned into position to serve as a supplemental bottom, the extension *e'* is parallel with the connecting-bar *f*, and the sleeve *g* may be slid on the bar until it embraces the said extension, as shown in Fig. 1. Thereby the two wings will be held in a horizontal position.

When it is desired to turn the wings to a vertical position, where they will be out of the way, the extension *e'* of the lever may be released by sliding the sleeve *g* along the bar *f*. The said extension will thereupon turn downward and the wings will assume a vertical position.

The ordinary bottom, A, may be removed to be cleaned when the supplemental bottom is in a horizontal position, and the bird being above the supplemental bottom will thereby be prevented from escaping.

A suitable spring, *h*, at one corner of the cage, bears against the lever, and serves, when the wings are in a vertical position, to hold them against the walls.

The cage here shown has four side walls, being an ordinary square one; but my improved supplemental bottom is applicable to cages of other form. For instance, instead of being square the cage may be hexagon or octagon, and in such case would require a wing for each side.

It is not essential to my invention that the wings which compose the supplemental bottom should be pivoted to and upon the inner side of the walls.

Figs. 4 and 5 illustrate other plans for attaching and operating wings to serve as a supplemental bottom to a bird-cage, substantially as already described. In Fig. 4 the wires of the wings are shown as attached to a bar, $i$, on the outer side of the cage-wall, and the said wing-wires slide horizontally between the cage-wall wires. At the innermost edge of the wing the wires are slightly curved, as shown at $k$, to adapt the wing, when drawn out and dropped down, to hang vertically on the outside, in which position the curved edge of the wing is connected with the wall-wires just above the middle band, L, of the cage. In Fig. 5 the wing is shown constructed like the one in Fig. 4, but its position is just above the lower band, B, and, when drawn out, instead of dropping down its outer end is raised, and a loop, $i'$, attached to the bar $i$, is made fast to a projecting pin or knob, $n$, wherefrom the wing hangs suspended on the outside of the cage. In Figs. 4 and 5 each of two opposite sides of the cage is shown with a fixed horizontal traverse wire or rod, P, and each wing is provided with two rings or eyes, $q$, each one of which encircles or fits on one of the said traverse-rods and will slide thereon when the wing is moved to assume either a vertical or horizontal position. By this means the traverse-rods sustain the interior ends of the wings, and, with the rings $q$, constitute the hinges whereby the wings are permitted to be swung into a horizontal position.

In the plans illustrated by Figs. 4 and 5 one or more wings are designed to be used, as fancy may suggest or the walls of the particular cage may require.

Having described my invention, I claim and desire to secure by Letters Patent of the United States—

1. A bird-cage having an ordinary bottom and provided with a supplemental bottom hinged to the cage-walls, whereby the said supplemental bottom may be moved to occupy a vertical position when the ordinary bottom is on, and a horizontal position when the ordinary bottom is removed, as set forth.

2. A bird-cage having an ordinary bottom and provided with a supplemental bottom composed of two or more wings, each hinged to the cage walls, substantially as and for the purpose set forth.

In testimony whereof I affix my signature in presence of two witnesses.

WILLIAM KAISER.

Witnesses:
CHARLES KAISER,
MARTIN L. KAISER.